United States Patent [19]

Bosch

[11] Patent Number: 5,027,506
[45] Date of Patent: Jul. 2, 1991

[54] ELECTRIC SHAVING APPARATUS
[75] Inventor: Sieds Bosch, Drachten, Netherlands
[73] Assignee: U.S. Philips Corporation, New York, N.Y.
[21] Appl. No.: 263,995
[22] Filed: Oct. 25, 1988

Related U.S. Application Data
[63] Continuation of Ser. No. 945,064, Dec. 19, 1986, abandoned.

[30] Foreign Application Priority Data
Jan. 22, 1986 [NL] Netherlands .......................... 8600133

[51] Int. Cl.$^5$ .............................................. B26B 19/28
[52] U.S. Cl. ........................................... 30/45; 30/85; 220/338
[58] Field of Search ................... 30/43.6, 43.91, 43.92, 30/32, 45, 85; 220/338

[56] References Cited
U.S. PATENT DOCUMENTS
4,631,825 12/1986 Kuriyama et al. ................. 30/43.92

Primary Examiner—Joseph M. Gorski
Assistant Examiner—Willmon Fridie, Jr.
Attorney, Agent, or Firm—Ernestine C. Bartlett

[57] ABSTRACT

An electric shaving apparatus comprising a housing having a compartment for an electric power source, which compartment is closed by a cover, the housing sections being secured to each other by a snapped connection between two interengaging connection elements, at least one of the connection elements being elastically deflexible to establish or release the snapped connection. The cover comprises a projection which in the closed position of the cover blocks a movement of at least one of the connection elements.

5 Claims, 2 Drawing Sheets

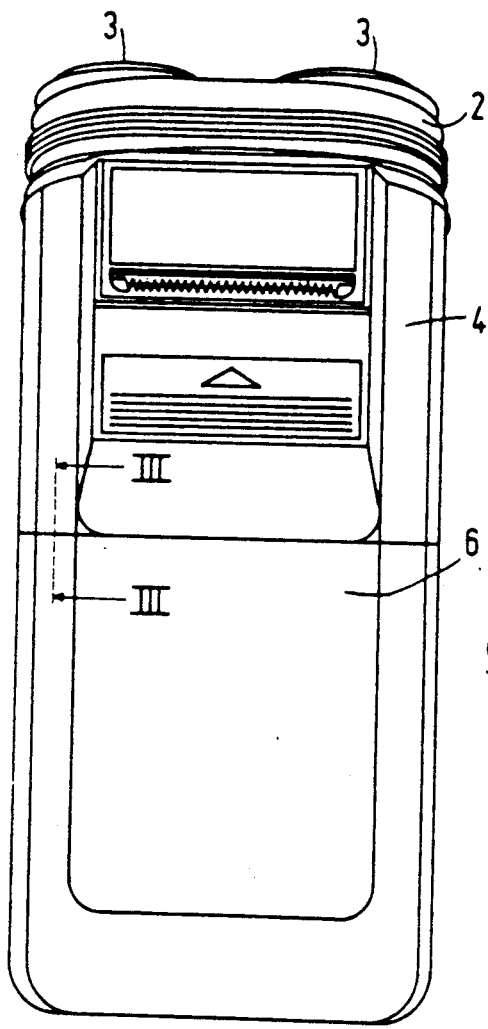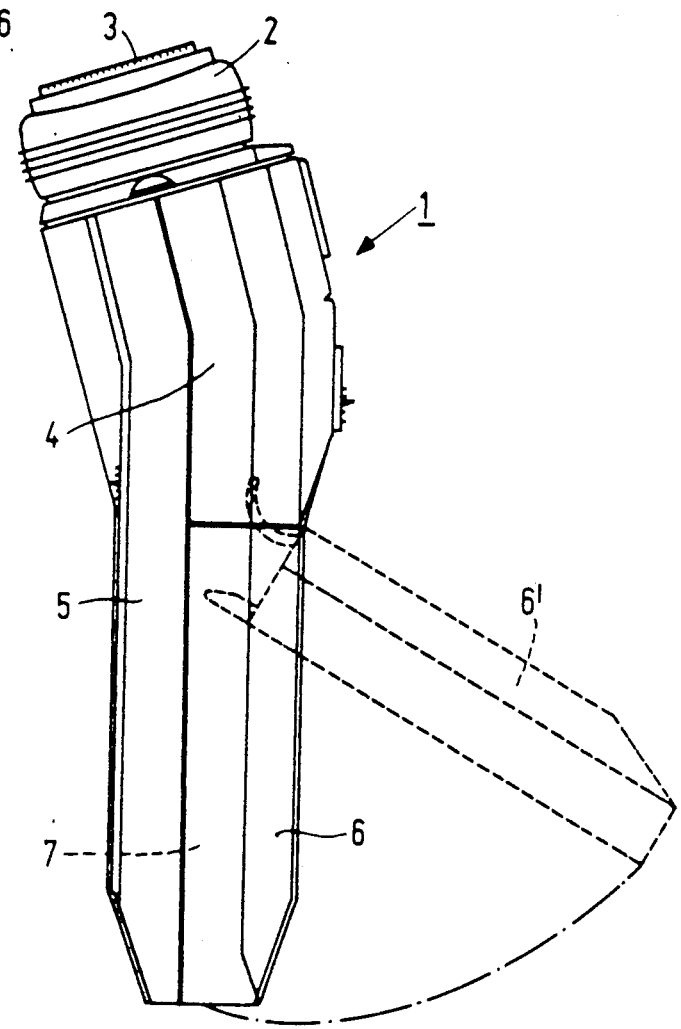
FIG.1
FIG.2

ELECTRIC SHAVING APPARATUS

This is a continuation of application Ser. No. 945,064, filed Dec. 19, 1986, now abandoned.

Field of the Invention

The invention relates to an electric shaving apparatus comprising a housing which is formed with a compartment which is closed by a cover and which is intended for an electric power source, for example a battery, housing sections being secured to each other by means of a snapped connection between two interengaging connection elements, at least one of the connection elements being elastically movable for establishing or releasing the snapped connection.

BACKGROUND OF THE INVENTION

A comparable construction is known from, for example U.S. Patent Specification No. 4,027,096. In the event of suddenly occurring forces, for example when the apparatus falls onto a hard surface, it may happen that the snapped connection is released and the housing sections fall apart.

SUMMARY OF THE INVENTION

It is the object of the invention to mitigate this drawback and to this end the invention is characterized in that the cover comprises a projection which in the closed position of the cover blocks a movement of at least one of the connection elements.

BRIEF DESCRIPTION OF THE DRAWINGS

FIG. 1 is a front view of a shaving apparatus in accordance with the invention.

FIG. 2 is a side view of the shaving apparatus shown in FIG. 1.

DETAILED DESCRIPTION OF THE PREFERRED EMBODIMENTS

Figure 3:
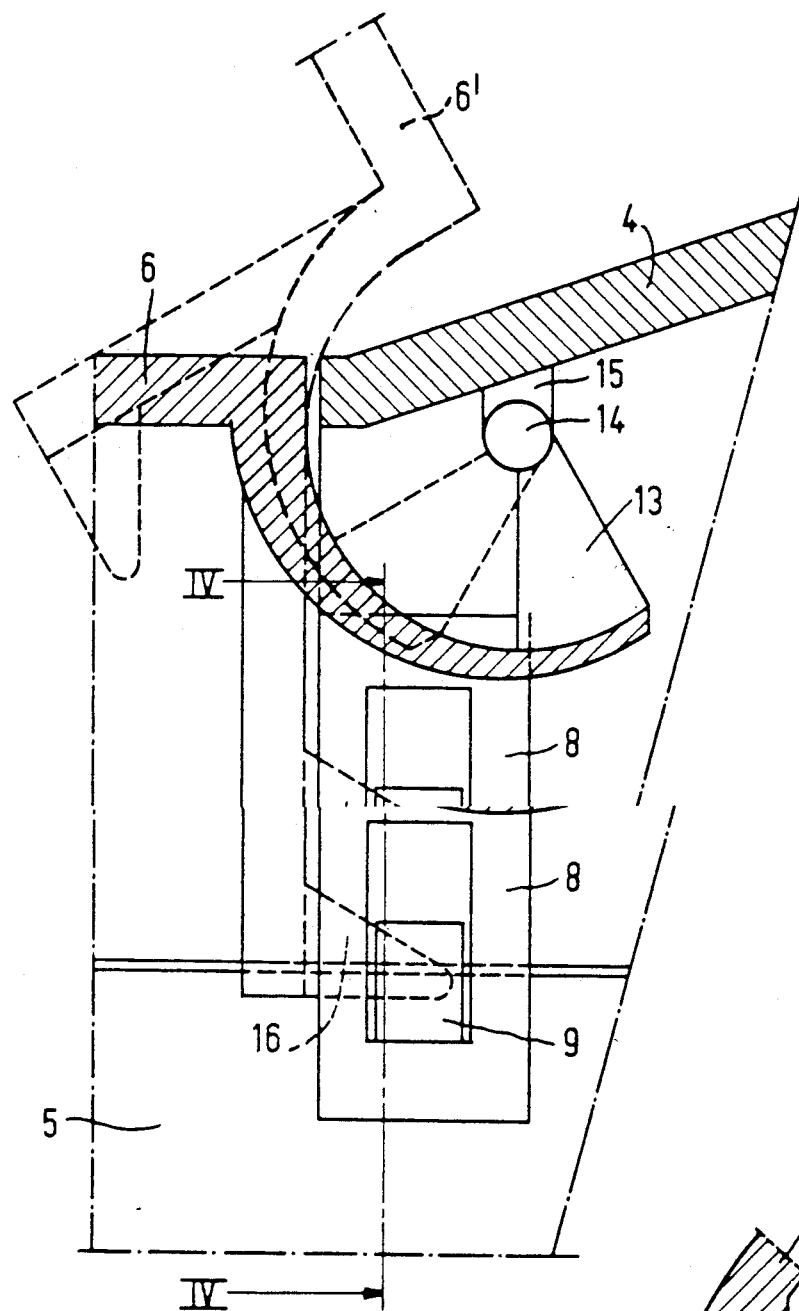
FIG. 3 is an enlarged-scale sectional view taken on the line III—III in FIG. 1.

The shaving apparatus shown in FIGS. 1 to 4 comprises a housing 1 with a holder 2 for two cutting units 3. The housing 1 comprises housing sections 4 and 5 and also comprises a hinged cover 6. The compartment 7 in the housing 1 is accessible in the open position of the cover 6, as is indicated by the broken lines 6' in FIG. 2. This compartment 7 can accommodate batteries for the power supply of the apparatus.

Figure 4:
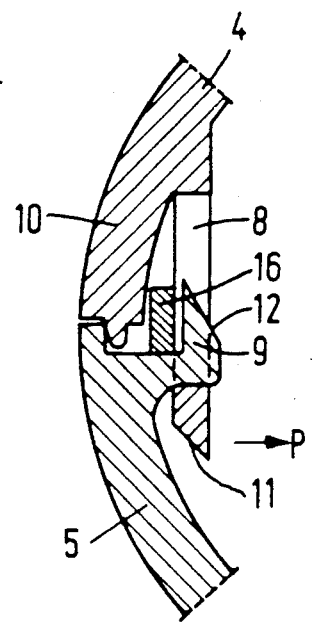
FIG. 4 is a sectional view taken on the line IV—IV in FIG. 3.

As is shown in FIGS. 3 and 4, the housing sections 4 and 5 are secured to each other by means of a snapped connection formed between two interengaging connection elements 8 and 9. The connection element 8 is constructed as a rectangular lug and is integral with a wall portion 10 of the housing section 4. The connection element 9 is hookshaped and is integral with the housing section 5. When the two housing sections 4 and 5 are pressed onto one another the oblique contact faces 11 and 12 of the connection elements 8 and 9 respectively will engage with each other, so that the connection element 8, which is elastically movable, will deflect slightly in the direction indicated by the arrow P. The connection element 8 can then engage around the connection element 9 to establish the snapped connection, as is shown in FIGS. 3 and 4. Suitably, such a snapped connection between the housing sections 4 and 5 is provided at two facing locations in the housing 1.

By means of an arm 13 and a pivot 14 the cover 6 is pivotally mounted in a recess 15 in the housing section 4. The cover is thus pivotable between a closed position, as is indicated by the reference numeral 6 (FIG. 3), and an open position, as is indicated by the broken lines 6'. The cover comprises a projection 16 which in the closed position of the cover 6 is situated between the connection elements 8 and 9 and the wall portion 10 of the housing section 4. This prevents the wall portion 10 from being pressed inwards when the apparatus falls or the like, so that the connection element 8, which is integral with the wall portion 10, would be urged away from the connection element 9 in the direction P, causing the snapped connection to be released inadvertently. As the projection 16 fills substantially the entire space between the wall portion 10 and the connection element 9 a displacement of the wall portion 10 and hence of the connection element 8 is thus blocked effectively.

What is claimed is:

1. An electric shaving apparatus comprising a housing which is formed with a compartment which is closed by a pivotable cover and housing sections secured to each other by means of a snapped connection between two interengaging connection elements, at least one of the connection elements being elastically movable for establishing or releasing the snapped connection, said cover comprising a projection which in a closed position of the cover fills substantially the space between at least one of the housing sections and at least one of the connection elements thereby blocking movement of at least one of the connection elements to substantially prevent the inadvertent release of the snapped connection elements when the electric shaving apparatus is dropped onto a hard surface.

2. An electric shaving apparatus comprising a housing (1) which is formed with a compartment (7) which is closed by a pivotable cover (6), housing sections (4) and (5) being secured to each other by means of a snapped connection formed between two interengaging connection elements (8) and (9), the connection element (8) being elastically movable, said cover (6) comprising a projection (16) which in the closed position of the cover is situated between the connection elements (8) and (9) and a wall portion (10) of the housing section (4), the projection (16) filling substantially the entire space between the wall portion (10) and the connection element (9) thereby blocking the inadvertent displacement of the connection element (8) and of the wall portion (10).

3. An electric shaving apparatus as claimed in claim 2 wherein the connection element (8) is constructed as a rectangular lug (8) formed integral with the wall portion (10) of the housing section (4).

4. An electric shaving apparatus as claimed in claim 3 wherein the connection element (9) is hook-shaped and is formed integral with the housing section (5).

5. An electric shaving apparatus as claimed in claim 4 wherein the cover is pivotably mounted in a recess (15) in the housing section (4).

* * * * *